(12) United States Patent
Yount et al.

(10) Patent No.: US 7,475,851 B2
(45) Date of Patent: Jan. 13, 2009

(54) METHOD AND APPARATUS FOR PREVENTING AN UNAUTHORIZED FLIGHT OF AN AIRCRAFT

(75) Inventors: Larry J. Yount, Scottsdale, AZ (US);
Joseph W. Jackson, Glendale, AZ (US);
Eric L. Christianson, Peoria, AZ (US);
Arthur D. Beutler, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 922 days.

(21) Appl. No.: 10/417,852

(22) Filed: Apr. 16, 2003

(65) Prior Publication Data

US 2004/0217232 A1 Nov. 4, 2004

(51) Int. Cl.
*B64D 25/00* (2006.01)
(52) U.S. Cl. .................. 244/118.5; 244/76 R
(58) Field of Classification Search ......... 244/76 R, 244/118.5; 701/3, 2, 36
See application file for complete search history.

(56) References Cited

U.S. PATENT DOCUMENTS

| | | | | |
|---|---|---|---|---|
| 4,924,401 A | * | 5/1990 | Bice et al. ................ | 701/6 |
| 6,573,839 B2 | * | 6/2003 | Kimmet ................ | 340/945 |
| 6,584,383 B2 | * | 6/2003 | Pippenger ................ | 701/3 |
| 2003/0050745 A1 | * | 3/2003 | Orton ................ | 701/3 |
| 2003/0055540 A1 | * | 3/2003 | Hansen ................ | 701/3 |
| 2003/0055541 A1 | * | 3/2003 | Haley ................ | 701/11 |
| 2003/0055564 A1 | * | 3/2003 | Tart et al. ................ | 701/301 |
| 2003/0130771 A1 | * | 7/2003 | Crank ................ | 701/4 |
| 2003/0139858 A1 | * | 7/2003 | Koncelik ................ | 701/2 |
| 2003/0144769 A1 | * | 7/2003 | Meier ................ | 701/3 |
| 2003/0163232 A1 | * | 8/2003 | Moretto ................ | 701/3 |

FOREIGN PATENT DOCUMENTS

| | | |
|---|---|---|
| DE | 10150661 A | 4/2003 |
| FR | 2829865 A | 3/2003 |
| FR | 2830103 A | 3/2003 |
| WO | WO03/024789 A | 3/2003 |
| WO | WO03/030125 A1 | 4/2003 |

* cited by examiner

*Primary Examiner*—Timothy D Collins
(74) *Attorney, Agent, or Firm*—Ingrassia Fisher & Lorenz, P.C.

(57) ABSTRACT

A fly-by-wire (FBW) system (104) is coupled to cockpit controls (102) of an aircraft for controlling the aircraft, and an automatic flight control system (AFCS) (108) is coupled to the FBW system for maintaining the aircraft in stable flight. An unauthorized-flight detector (110) is coupled to the FBW system and coupled to the AFCS, and is arranged to carry out (306) a transfer of control of the FBW system from the cockpit controls to the AFCS, in response to a predetermined event.

9 Claims, 7 Drawing Sheets

METHOD AND APPARATUS FOR PREVENTING AN UNAUTHORIZED FLIGHT OF AN AIRCRAFT

TECHNICAL FIELD

This invention relates in general to aircraft flight control systems, and more specifically to a method and apparatus for preventing an unauthorized flight of an aircraft.

BACKGROUND

While the modern aircraft is a wonderful machine for quickly transporting people and freight, recent events have demonstrated that the modern aircraft can all too easily be taken over by suicide murderers and turned into a machine of death and destruction. Although much has been done since the first such attack to make it more difficult for hijackers to board and take over a commercial airliner, vulnerabilities still exist.

Accordingly, it is desirable to provide a method and apparatus for preventing an unauthorized flight of an aircraft. To the extent possible, the method and apparatus, once activated, preferably should be impossible to override by anyone on the aircraft once activated in accordance with the present invention. Furthermore, other desirable features and characteristics of the present invention will become apparent from the subsequent detailed description and the appended claims, taken in conjunction with the accompanying drawings and the foregoing technical field and background.

BRIEF SUMMARY

A method of preventing an unauthorized flight of an aircraft having a fly-by-wire (FBW) system coupled to cockpit controls of the aircraft for controlling the aircraft, and having an automatic flight control system (AFCS) capable of maintaining the aircraft in stable flight. The method comprises equipping the aircraft with an unauthorized-flight detector coupled to the FBW system and coupled to the AFCS; and carrying out, by the unauthorized-flight detector, a transfer of control of the FBW system from the cockpit controls to the AFCS, in response to a predetermined event.

Another aspect of the present invention is an apparatus for preventing an unauthorized flight of an aircraft. The apparatus comprises a fly-by-wire (FBW) system coupled to cockpit controls of the aircraft for controlling the aircraft, and an automatic flight control system (AFCS) coupled to the FBW system for maintaining the aircraft in stable flight. The apparatus further comprises an unauthorized-flight detector coupled to the FBW system and coupled to the AFCS; the unauthorized-flight detector arranged to carry out a transfer of control of the FBW system from the cockpit controls to the AFCS, in response to a predetermined event.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
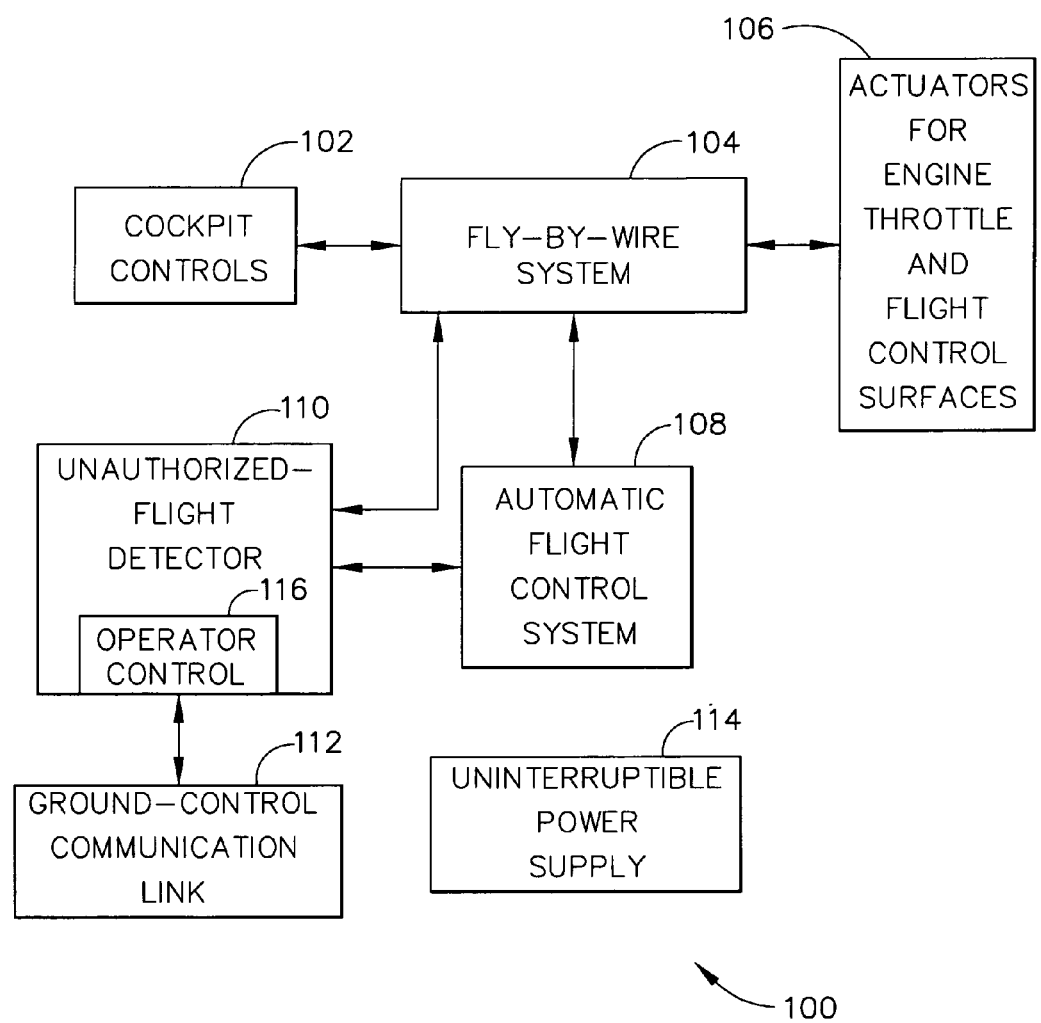
FIG. 1 is an electrical block diagram of an exemplary first embodiment of an apparatus for preventing an unauthorized flight of an aircraft.

In overview form, the present disclosure concerns flight control systems for aircraft. More particularly, various inventive concepts and principles embodied as a method and apparatus for preventing an unauthorized flight of an aircraft will be discussed and disclosed. The aircraft of particular interest are large aircraft being deployed and developed for commercial passenger and freight transportation, although the concepts and principles have application in other aircraft types and in other transportation vehicles.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit the invention in any manner. The invention is defined solely by the appended claims including any amendments made during the tendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in one or more conventional digital signal processors (DSPs) or conventional microprocessors, or with integrated circuits (ICs) such as custom or application-specific ICs. It is expected that one of ordinary skill, notwithstanding possibly significant effort and many design choices motivated by, for example, available time, current technology, and economic considerations, when guided by the concepts and principles disclosed herein will be readily capable of programming such processors, or generating such ICs with minimal experimentation. Therefore, in the interest of brevity and minimization of any risk of obscuring the principles and concepts according to the present invention, further discussion of such processors and ICs, if any, will be limited to the essentials with respect to the principles and concepts employed by the preferred embodiments.

Modern aircraft are increasingly equipped with fly-by-wire (FBW) systems. Such systems typically employ a digital processor, which accepts control inputs from the cockpit controls and translates the control inputs into digital control signals for actuators that physically move the engine throttles and flight control surfaces, e.g., the rudder, elevator, and ailerons, of the aircraft. In addition, most modern aircraft are equipped with an automatic flight control system (AFCS), often referred to as an "autopilot," which cooperates with the inertial and air data systems of the aircraft to maintain the aircraft in stable flight without pilot assistance. More sophisticated aircraft in use today utilize an AFCS that not only can keep the wings level, but also can maintain the heading, altitude, and airspeed of the aircraft.

In addition, the most sophisticated aircraft today include a flight management system (FMS) that can navigating the aircraft along a selected one of a plurality of pre-programmed routes from an origination point to a predetermined destination and can cooperate with an automatic landing and rollout system (ALRS) at the predetermined destination to safely land the aircraft, with no intervention required from the pilot, once the FMS is programmed and activated.

In the past, the AFCS, and the FMS have been considered primarily to be pilot-responsive load-reducing aids. These systems have been arranged to obey the explicit instructions of the pilot of the aircraft, who can take over full control of the aircraft from these systems at any time. Even the FBW system, which in some cases is arranged to "filter" the control signals of the pilot to improve stability and smoothness of control, ultimately allows the aircraft to do essentially whatever the pilot commands.

Recent world events have indicated that there can be situations in which such responsiveness to the pilot's commands may not be desirable. A clear case in which it seems preferable that the aircraft fly itself automatically (at least temporarily) rather than respond to the cockpit controls, is after the aircraft has been hijacked, for example, by someone intending to turn the aircraft into a destructive missile. Another case is when the pilot appears to be attempting to deliberately crash the aircraft, such as by flying the aircraft into the ground in a steep dive. Several embodiments in accordance with the present invention are disclosed herein below that are intended to prevent such unauthorized flight of the aircraft.

Briefly, several levels of protection are disclosed herein. Preferably all embodiments will be fully integrated systems to maximize security. The first level of protection is not to allow the aircraft to descend below a predetermined altitude above the ground (per the Air-Data systems of the aircraft). The intent is for protection from typical ground object hazards such as mountains. This requires the basic sensors for FBW, Auto-Throttle, Air-Data and rate/acceleration/attitude from an inertial reference subsystem is available. Optionally, a simple auto-pilot or AFCS would be helpful for keeping the wings level. Power and interlocks for continued operation of the FBW, the Air-Data and the inertial reference subsystem preferably are merged.

The second level of protection is to require the aircraft to land when a coupling to conventional glide-slope and localizer landing reference signals is achieved. This would require the aircraft to be able to descend to a (still safe) altitude to capture the landing reference signals. The addition of a more sophisticated AFCS is required for this. Once on the ground and rolling at approximately 60 knots the pilot is required to safely stop the aircraft to prevent damage to the aircraft and airport infrastructure. Optionally, additional elements can be added to stop the aircraft when on the ground. The third level of protection is to include the FMS system to navigate to an airport, couple to the landing reference signals, and land. This would bring into the integrated system the FMC subsystem.

Referring to FIG. 1, an electrical block diagram depicts an exemplary first embodiment 100 of an apparatus for preventing an unauthorized flight of an aircraft. The first embodiment comprises conventional cockpit controls 102 for use with a fly-by-wire (FBW) system. The cockpit controls 102 preferably comprise such items as a control yoke, rudder pedals, engine throttles, a trim adjustment control, and wing flap control, to name a few. The cockpit controls 102 are coupled to a conventional FBW system 104, modified such that control of the FBW system 104 can be transferred from the cockpit controls 102 to a conventional automatic flight control system (AFCS) 108 by a command from an unauthorized-flight detector (UFD) 110 in accordance with the present invention. The FBW system 104 is coupled to conventional actuators 106 for controlling the engine throttles and flight control surfaces of the aircraft through well-known techniques.

The first embodiment 100 further comprises the UFD 110 coupled to the FBW system 104. The UFD 110 includes an operator control 116 that preferably serves as a manual trigger, or "panic button," through which the pilot can activate a transfer of control of the FBW system from the cockpit controls to the AFCS 108, in response to an attempted hijacking. Further details of the unauthorized-flight detector 110 are disclosed herein below. The first embodiment 100 also includes the AFCS 108 coupled to the UFD 110 and coupled to the FBW system 104 for controlling the FBW system 104 when directed to do so by the UFD 110. The first embodiment 100 further comprises a conventional ground-control communication link 112 coupled to the UFD 110 for providing communications and control signals between ground controllers and the UFD 110. For example, the UFD 110 can send an alarm through the ground-control communication link 112 to alert ground controllers after a transfer of control has occurred. In addition, ground control can send a special signal to the UFD 110 through the ground-control communication link 112 to restore cockpit control when deemed appropriate. It will be appreciated that the ground-control communication link 112 can also be used to reverse the restoration of cockpit control as well.

The first embodiment 100 also includes an uninterruptible power supply 114, coupled to the UFD 110 and coupled to other elements required for controlling the aircraft, such as portions of the FBW system 104, the AFCS 108 and the ground control communication link 112. (To reduce drawing complexity, couplings between the uninterruptible power supply 114 and all other elements required for controlling the aircraft are not shown in FIG. 1.) To harden the apparatus against intrusion, it is preferred that, to the extent possible, the UFD 110, the AFCS 108, the uninterruptible power supply 114, and the FBW system 104 be combined into a single integrated system. It will be appreciated that in the most rudimentary embodiments, the functions of the AFCS 108 can be minimized or even eliminated. The latter embodiment would require that the pilot maintain general control of the aircraft, while the UFD 110 and the FBW system 104 would merely prevent the aircraft from descending below a predetermined minimum altitude above ground.

Figure 2:
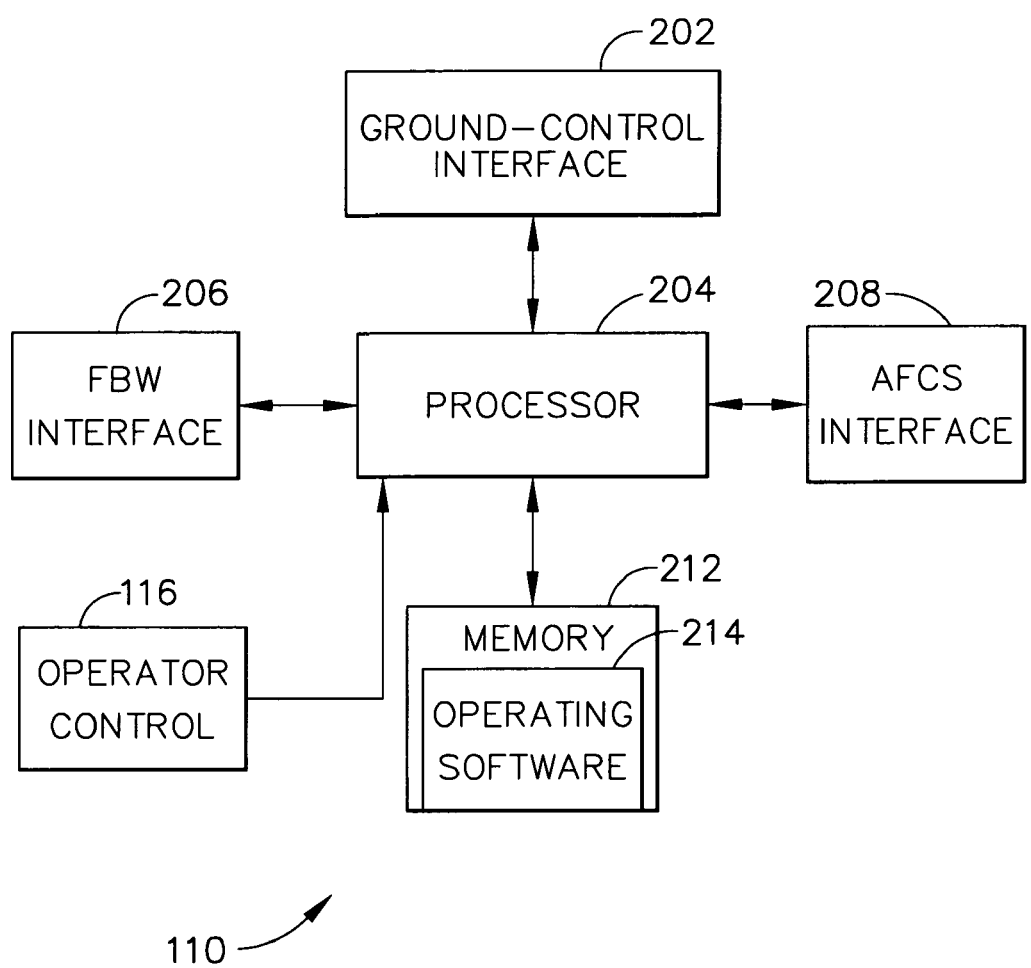
FIG. 2 is an electrical block diagram of an exemplary unauthorized-flight detector.

Referring to FIG. 2, an electrical block diagram depicts further details of the exemplary UFD 110. The UFD 110 comprises a conventional processor 204 for controlling the UFD 110. The operator control 116 is coupled to the processor 204 for commanding the UFD 110 to transfer control of the aircraft from the cockpit controls 102 to the AFCS 108. In one embodiment, the operator control 116 is a simple pushbutton switch, preferably mechanically guarded to prevent accidental operation. Alternatively, the operator control 116 can comprise more than one switch. The UFD 110 further comprises a conventional memory 212 coupled to the processor 204 for storing operating software 214 for programming the processor 204 in accordance with the present invention. The UFD 110 also includes a FBW interface 206 coupled to the processor 204 for providing communication between the UFD 110 and the FBW system 104 through well-known computer-to-computer communication techniques. Similarly, the UFD 110 includes an AFCS interface 208 coupled to the processor 204 for providing communication between the UFD 110 and the AFCS 108 through well-known computer-to-computer communication techniques. In addition, the UFD 110 includes a ground-control interface 202 coupled to the processor 204 for providing communication between the UFD 110 and ground control equipment through conventional techniques.

Figure 3:
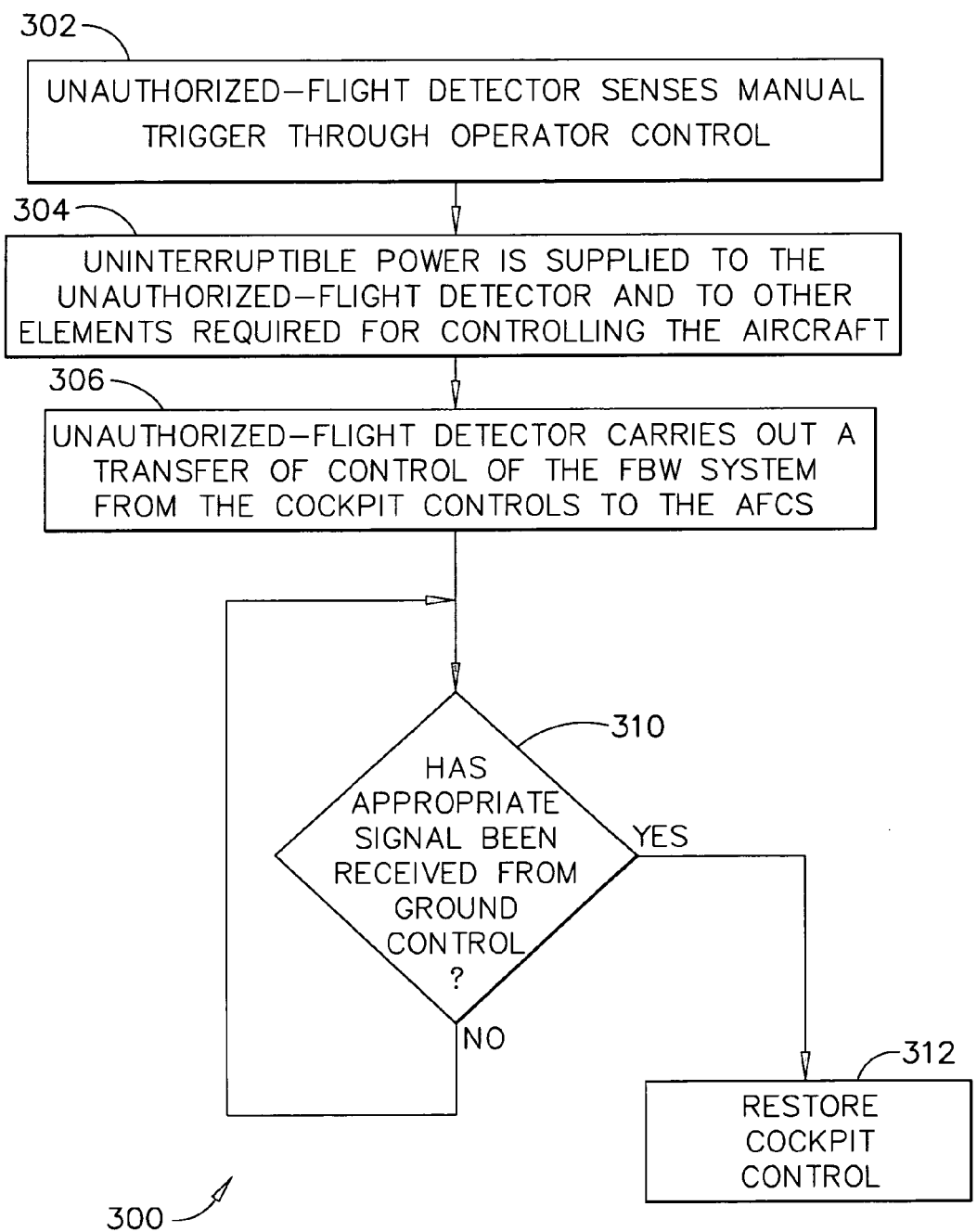
FIG. 3 is a flow diagram depicting operation of the first embodiment.

Referring to FIG. 3, a flow diagram 300 depicts operation of the first embodiment 100 of the apparatus for preventing an unauthorized flight of an aircraft. The flow begins when the UFD 110 senses 302 a manual trigger through the operator control 116. At this point, the uninterruptible power supply 114 supplies 304 uninterruptible power to the UFD 110 and other elements, such as the FBW system 104 and the AFCS 108, required for controlling the aircraft. "Uninterruptible power" as used herein is defined as power that is not routed through a circuit breaker or switch in the cockpit. To the extent possible, it is preferable that the power cannot be easily interrupted from anywhere inside the aircraft while it is in flight.

In response to the manual trigger, the UFD 110 communicates with the FBW system 104 and the AFCS 108 to carry out 306 a transfer of control of the FBW system 104 from the cockpit controls 102 to the AFCS 108. It is worth noting here that the transfer of control can be either complete or partial, depending upon what is deemed to be prudent. In the case of a transfer of complete control to the AFCS 108, all cockpit controls will cease to function, and the aircraft will be controlled exclusively by the AFCS 108, maintaining, for example, the current heading, airspeed, and altitude of the aircraft. While this might seem to be a sure way to foil a would-be-terrorist, it could have disastrous results if the aircraft were, for example, flying at a low altitude and heading toward a high mountain. An alternative, perhaps more prudent, approach would be to transfer partial control of the aircraft to the AFCS 108. For example, the cockpit controls might be allowed to initiate gentle turns, but not allowed to cause the aircraft to descend. As a further alternative, the AFCS 108 could be programmed to cause the aircraft to change to a predetermined altitude. Yet another alternative would be to allow the aircraft to descend only when coupled with an automatic landing system of an airport. Because the AFCS 108 and the UFD 110 are controlled by processors and software, the degrees of the transfer of control are virtually unlimited and thus preferably are programmable through well-known techniques, so that future changes and improvements can be implemented easily.

The UFD 110 next checks 310 whether an appropriate control signal has been received from ground control over the ground-control communication link. If so, the UFD 110 restores 312 full control of the FBW system 104 to the cockpit controls 102. Preferably, the appropriate control signal is sent from ground control only when there is great certainty that either an attempted hijacking never occurred (accidental triggering of the UFD 110), or that the hijackers have been subdued. It also is preferred that the control signal be highly secure and virtually impossible for a potential terrorist to replicate.

Figure 4:
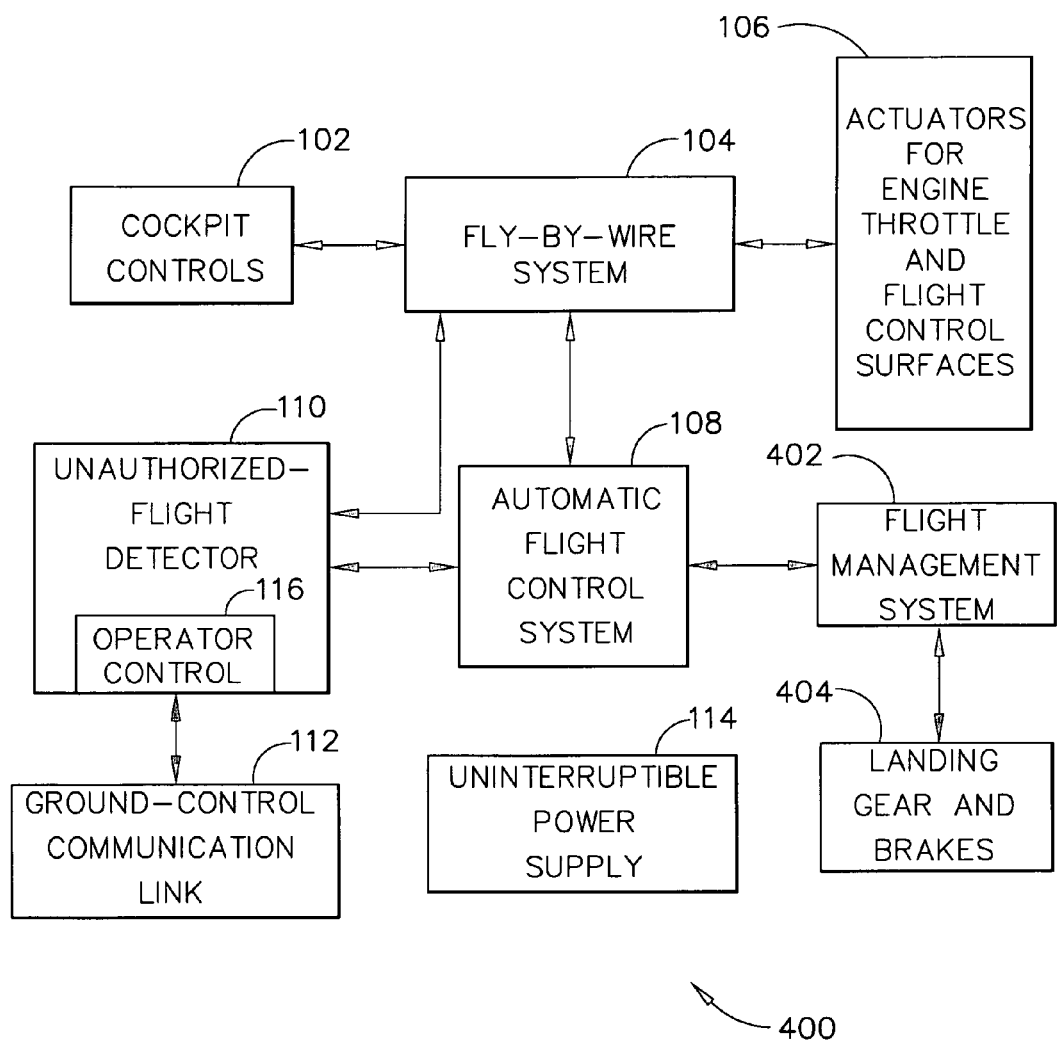
FIG. 4 is an electrical block diagram of an exemplary second embodiment of an apparatus for preventing an unauthorized flight of an aircraft.

Referring to FIG. 4, an electrical block diagram depicts an exemplary second embodiment 400 of an apparatus for preventing an unauthorized flight of an aircraft. The second embodiment 400 is similar to the first embodiment 100, the essential difference being the addition of a conventional flight management system (FMS) 402 coupled to the AFCS 108, and modified slightly in accordance with the present invention. In response to a command from the UFD 110, the FMS 402 is preferably arranged and programmed to cooperate with the AFCS 108 to navigate the aircraft to a predetermined destination airport and to cooperate with an automatic landing and rollout system (ALRS) to safely land the aircraft. The FMS 402 is preferably also coupled to the landing gear and brakes 404 of the aircraft so that at the appropriate points it can lower the landing gear and apply the brakes to stop the aircraft. As in the first embodiment 100, it is preferred that a high level of integration be employed among the essential elements (104, 108, 110, 114, and 402) of the apparatus to help prevent intervention.

Figure 5:
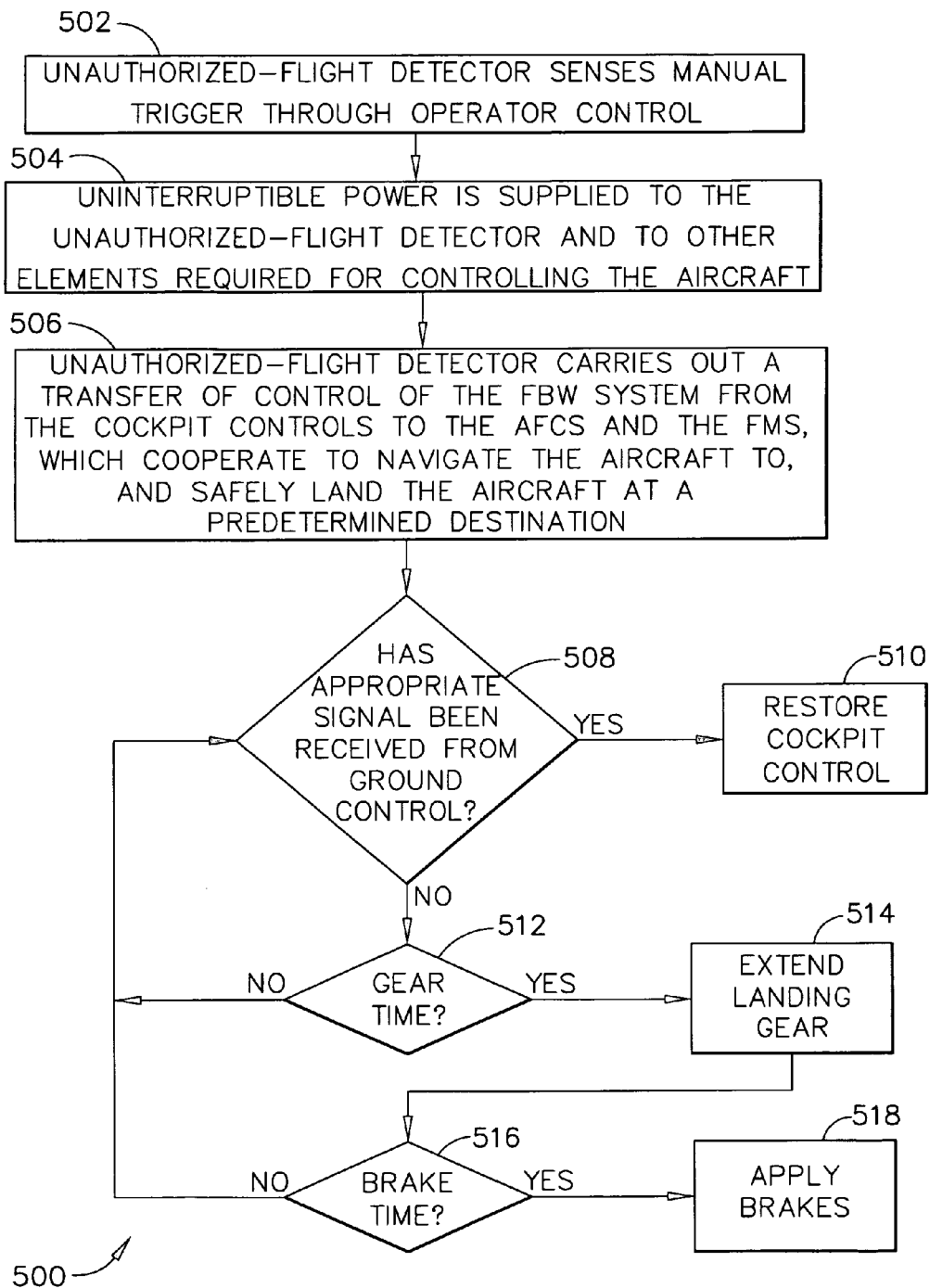
FIG. 5 is a flow diagram depicting operation of the second embodiment.

Referring to FIG. 5, a flow diagram 500 depicts operation of the second embodiment 400. The flow begins when the UFD 110 senses 502 a manual trigger through the operator control 116. At this point, the uninterruptible power supply 114 supplies 504 uninterruptible power to the UFD 110 and other elements, such as the FBW system 104, the AFCS 108, and the FMS 402, required for controlling the aircraft. "Uninterruptible power" as used herein is defined as power that is not routed through a circuit breaker or switch in the cockpit. To the extent possible, it is preferable that the power cannot be easily interrupted from anywhere inside the aircraft while it is in flight.

In response to the manual trigger, the UFD 110 communicates with the FBW system 104, the AFCS 108, and the FMS 402 to carry out 506 a transfer of full control of the FBW system 104 from the cockpit controls 102 to the AFCS 108 and the FMS 402. The AFCS 108 and the FMS 402 then cooperate to navigate the aircraft to the predetermined destination airport and eventually to safely land the aircraft while cooperating further with a conventional automatic landing and rollout system (ALRS) at the predetermined destination airport. While en route to the destination airport, the UFD 110 checks 508 whether an appropriate signal has been received from ground control through the ground-control communication link 112. If so, the UFD 110 restores 510 control of the aircraft to the cockpit controls. If not, the FMS 402 checks 512 whether it is appropriate at this point to extend, or lower, the landing gear. If so, the FMS 402 lowers 514 the landing gear (or, alternatively, the AFCS lowers the landing gear, if such an automatic process is in place—otherwise this remains a pilot responsibility), and then checks 516 whether it is time to apply the brakes. If so, the FMS 402 applies 518 the brakes (or, alternatively, the AFCS applies the brakes, if such an automatic process is in place—otherwise this remains a pilot responsibility) to stop the aircraft. If in steps 512 and 516 it is not time to lower the gear or apply the brakes, the flow returns to step 508 to continue checking.

The capability of the second embodiment 400 to navigate the aircraft to the predetermined destination airport and safely land without human intervention advantageously provides a powerful deterrent to aircraft hijacking. A further advantage of the second embodiment 400 is that it seems to provide a high probability of passenger survival of an attempted hijacking.

Figure 6:
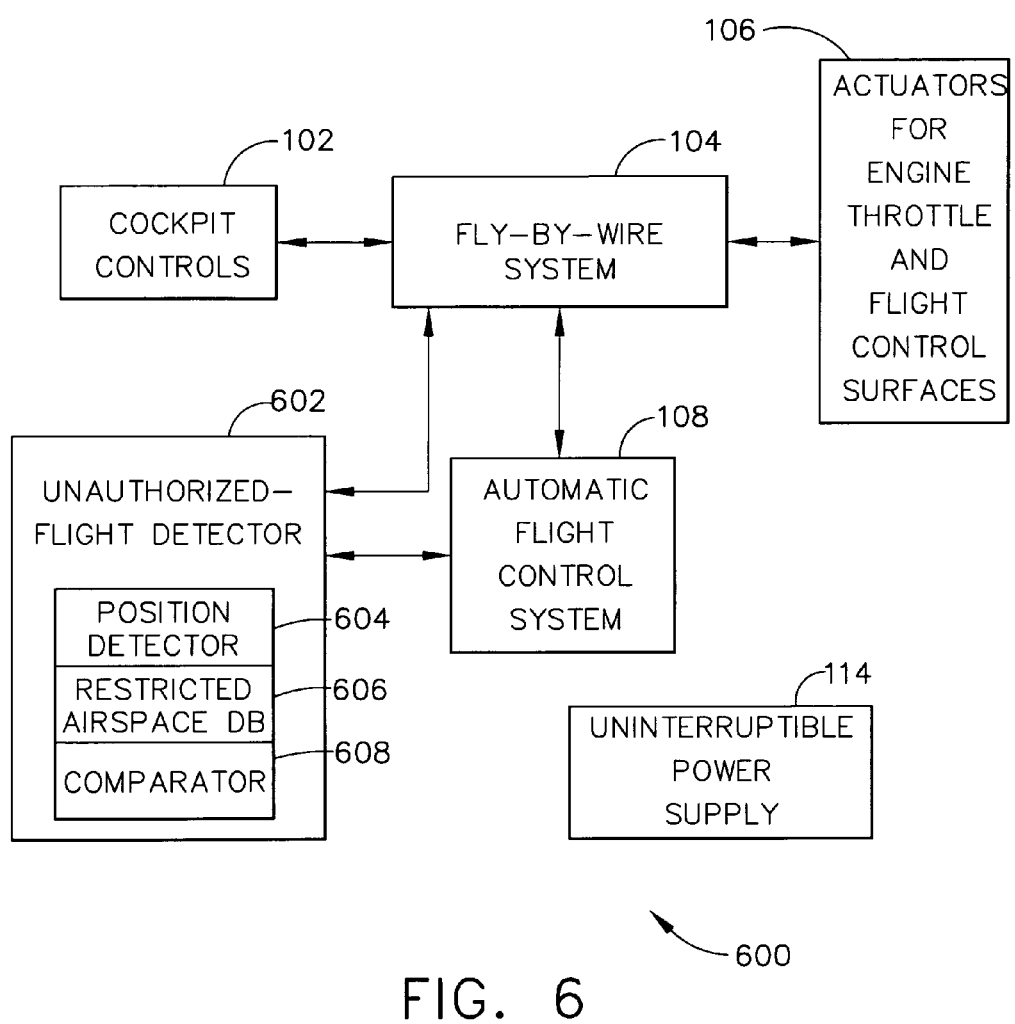
FIG. 6 is an electrical block diagram of an exemplary third embodiment of an apparatus for preventing an unauthorized flight of an aircraft.

Referring to FIG. 6, an electrical block diagram depicts an exemplary third embodiment 600 of an apparatus for preventing an unauthorized flight of an aircraft. The third embodiment 600 is similar to the first embodiment 100, the essential difference being that the UFD 602 comprises a position detector 604, a restricted airspace database 606, and a comparator 608, which replace the operator control 116 of the UFD 110 of the first embodiment 100. In addition, the ground-control communication link 112 is optional in the third embodiment 600. The position detector 604 preferably comprises a conventional Global Positioning System (GPS) receiver for determining position parameters including the geographic coordinates corresponding to the instantaneous position of the aircraft, along with ground speed and direction of travel. The position detector 604 preferably also receives ground clearance information from conventional detectors on the aircraft.

The restricted airspace database 606 preferably comprises a memory element, e.g., a magnetic disk drive, pre-programmed with a database including geographic boundaries and altitudes below which flight is restricted when flying within the geographic boundaries. For example, the database could describe the boundaries of large cities up to an altitude of 4000 feet (305 meters) as restricted airspace. Other potential terrorist targets, e.g., nuclear power plants, stadiums, and oil refineries, preferably would also be included in the restricted airspace database 606. The comparator 608 preferably comprises software for programming the processor 204 to compare through well-known techniques the position parameters including the instantaneous position, speed, direction, and ground clearance of the aircraft with information in the restricted airspace database 606 to control the UFD 602 to prevent the aircraft from entering the restricted airspace. In addition, the comparator 608 preferably is arranged and programmed to prevent dangerous flight maneuvers, such as attempting to fly the aircraft into the ground. As before, a high level of integration of the UFD 602, the AFCS 108, the FBW system 104, and the uninterruptible power supply 114 is preferred to prevent unauthorized intervention.

Figure 7:
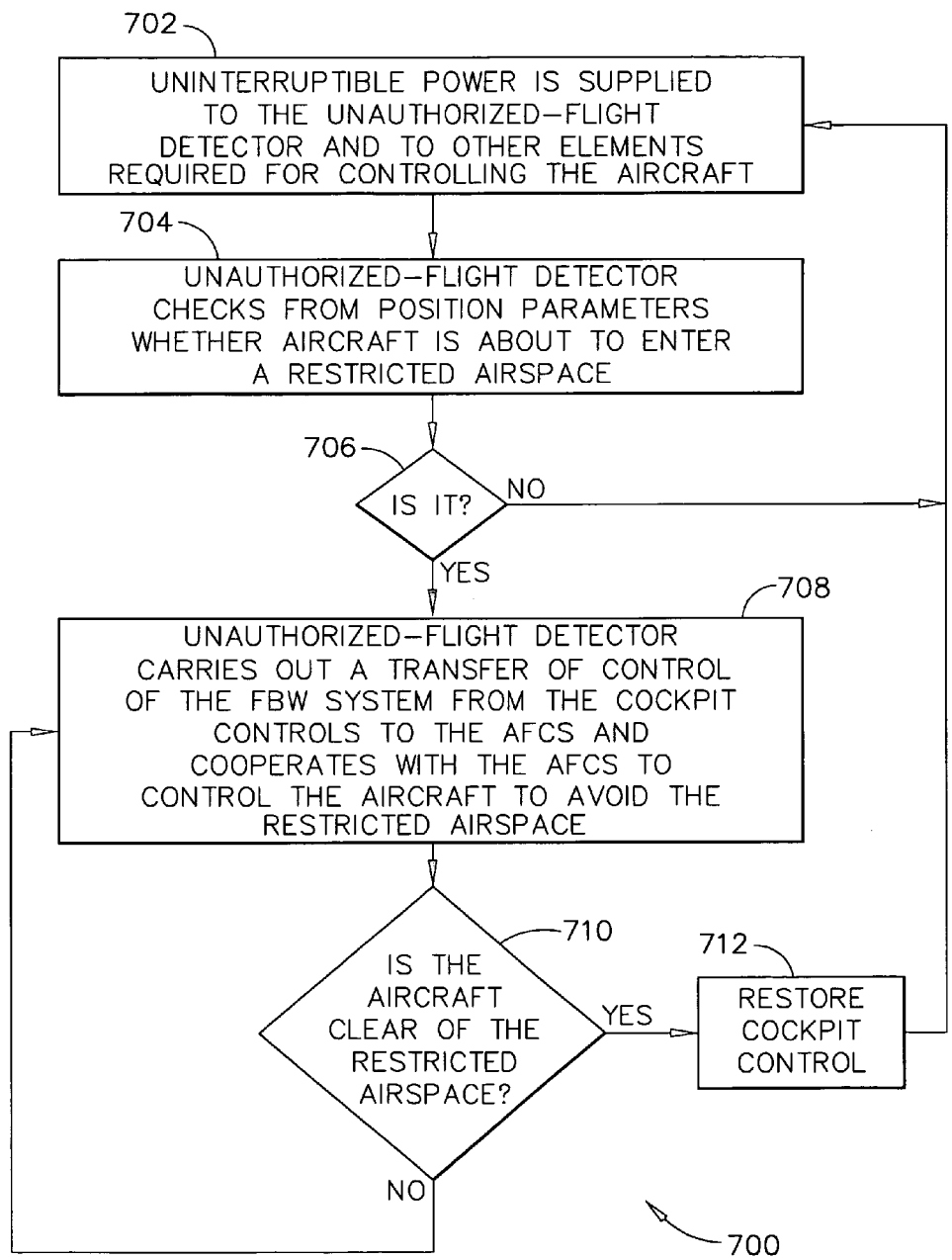
FIG. 7 is a flow diagram depicting operation of the third embodiment.

Referring to FIG. 7, a flow diagram 700 depicts operation of the third embodiment 600. The flow begins with uninterruptible power being supplied 702 to the UFD 602. This is necessary, because the third embodiment 600 operates continuously in the background, monitoring the flight of the aircraft to ensure that the aircraft does not enter restricted airspace. The UFD 602 continuously checks 704, 706 from the position parameters of the position detector 604 whether the aircraft is about to enter a restricted airspace (or perform a dangerous maneuver). If not, the flow returns to 702 to continue.

If, on the other hand, the aircraft is about to enter a restricted airspace (or perform a dangerous maneuver), the UFD 602 carries out 708 a transfer of control of the FBW system 104 from the cockpit controls to the AFCS 108 and cooperates with the AFCS 108 to control the aircraft to avoid the restricted airspace. Avoiding the restricted airspace can include causing the aircraft to climb to a different altitude, changing the direction of flight, or both. (When the UFD 602 has determined that the aircraft may be about to enter a restricted airspace, it is preferred that the UFD 602 cause an audible and/or visible warning to be issued in the cockpit before carrying out the transfer of control, so that the pilot has an opportunity to take corrective action in the case of inadvertency.) At 710 the UFD 602 checks whether the position parameters now indicate that the aircraft is well clear of the restricted airspace. If so, the UFD 602 restores 712 control of the FBW system 104 to the cockpit controls, and the flow then returns to 702 to continue. If not, the flow returns to 708 to continue controlling the aircraft to avoid the restricted airspace.

The third embodiment 600 operates in background at all times and thus advantageously does not require the pilot to trigger its operation. The "always on" nature of the third embodiment 600 allows the third embodiment 600 to protect the aircraft when the authorized pilot is attacked by surprise and even when the authorized pilot himself attempts a dangerous maneuver that could potentially cause the aircraft to crash.

Thus, it should be clear from the preceding disclosure that the present invention provides a method and apparatus for preventing an unauthorized flight of an aircraft. The method and apparatus once activated, advantageously is virtually impossible to override by anyone on the aircraft—including a trained pilot. One of ordinary skill in the art will recognize the technique disclosed herein is general and can be implemented with many degrees of freedom. For example, various aspects of the first, second, and third embodiments 100, 400, 600 are not mutually exclusive and can be combined and used together on the same aircraft. This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is

1. An apparatus for preventing an unauthorized flight of an aircraft, the apparatus comprising:
    a fly-by-wire (FBW) system coupled to cockpit controls of the aircraft for controlling the aircraft;
    an automatic flight control system (AFCS) coupled to the FBW system for maintaining the aircraft in stable flight;
    an unauthorized-flight detector coupled to the FBW system and coupled to the AFCS; the unauthorized-flight detector arranged to allow a partial transfer of control of the FBW system from the cockpit controls to the AFCS, in response to receiving a manual trigger of an operator control for the unauthorized-flight detector, the unauthorized-flight detector further arranged to carry out a transfer of control of the FBW system from the cockpit controls to the AFCS, in response to receiving a automatic trigger of the unauthorized-flight detector;
    an uninterruptible power system that is not routed through a circuit breaker or switch in the cockpit coupled to the unauthorized-flight detector, for supplying power to the unauthorized-flight detector and to other elements required for controlling the aircraft while preventing the unauthorized flight; and
    wherein the AFCS is operable to cause the aircraft to ascend to an altitude sufficient to avoid structure or terrain features upon the transfer of control of the FBW system from the cockpit control to the AFCS.

2. The apparatus of claim 1, further comprising a ground-control communication link coupled to the unauthorized-flight detector, and wherein, after carrying out the transfer of control, the unauthorized-flight detector is further arranged to restore cockpit control in response to receiving an appropriate signal over the ground-control communication link.

3. The apparatus of claim 1, further arranged to allow the aircraft to descend only when coupled with an automatic landing system of an airport.

4. The apparatus of claim 1, further comprising a flight management system (FMS) capable of navigating the aircraft to a predetermined destination and cooperating with an automatic landing and rollout system (ALRS) at the predetermined destination to safely land the aircraft, and wherein the unauthorized-flight detector is further arranged to carry out the transfer of control by effecting cooperation between the FMS and the AFCS to navigate the aircraft to, and safely land the aircraft at, the predetermined destination.

5. The apparatus of claim 4, further arranged to lower landing gear of the aircraft at an appropriate point before landing.

6. The apparatus of claim 4, further arranged to apply brakes at an appropriate point after landing to stop the aircraft.

7. The apparatus of claim 1, wherein the unauthorized-flight detector comprises:
  a position detector arranged to determine position parameters of the aircraft; and
  a pre-programmed database of restricted airspaces; and
  a comparator coupled to the position detector and to the pre-programmed database for comparing the position parameters of the aircraft with the pre-programmed database, and wherein the unauthorized-flight detector is further arranged to carry out the transfer of control in response to the position parameters indicating that the aircraft is about to enter one of the restricted airspaces.

8. The apparatus of claim 7, wherein the unauthorized-flight detector is further arranged to change at least one of an altitude and a direction of flight of the aircraft, such that the aircraft avoids the one of the restricted airspaces.

9. The apparatus of claim 7, wherein the unauthorized-flight detector is further arranged to automatically restore cockpit control after the aircraft has successfully avoided the one of the restricted airspaces without intervention from outside the aircraft.

* * * * *